United States Patent
Ito et al.

(10) Patent No.: US 6,447,076 B1
(45) Date of Patent: Sep. 10, 2002

(54) DEVICE AND METHOD FOR ESTIMATING PHYSICAL QUANTITY AND DEVICE AND METHOD FOR ABS CONTROL

(75) Inventors: Shoji Ito, Susono (JP); Eiichi Ono, Aichi-gun (JP); Masaru Sugai, Aichi-ken (JP); Takaji Umeno, Aichi-gun (JP); Katsuhiro Asano, Aichi-gun (JP); Hiroyuki Yamaguchi, Aichi-gun (JP); Satoru Onozawa, Kariya (JP)

(73) Assignees: Toyota Jidosha Kabushiki Kaisha, Toyota (JP); Kabushiki Kaisha Chuo Kenkyusho, Aichi (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/407,894

(22) Filed: Sep. 29, 1999

(30) Foreign Application Priority Data

Oct. 2, 1998 (JP) .............................. 10-281660

(51) Int. Cl.⁷ .............................. B60T 8/60; B60T 8/32; B60T 8/74
(52) U.S. Cl. .................. 303/150; 303/194; 303/177
(58) Field of Search ................. 303/158, 191, 303/194, 195, 177, 150, 148, 149

(56) References Cited

U.S. PATENT DOCUMENTS

| | | |
|---|---|---|
| 4,875,171 A | 10/1989 | Fujioka et al. |
| 4,912,967 A | 4/1990 | Shiraishi et al. |
| 5,085,288 A | 2/1992 | Shiraishi et al. |
| 5,435,635 A | 7/1995 | Watanabe |
| 5,583,772 A | 12/1996 | Kitano et al. |
| 5,588,721 A * | 12/1996 | Asano et al. ............... 303/194 |
| 5,634,699 A | 6/1997 | Ichikawa et al. |
| 5,662,393 A * | 9/1997 | Kamiya et al. ............. 303/194 |
| 5,809,445 A | 9/1998 | Yamamoto et al. |
| 5,878,365 A * | 3/1999 | Onogi et al. ................ 303/191 |
| 5,948,961 A | 9/1999 | Asano et al. |
| 6,182,001 B1 * | 1/2001 | Sugai et al. ................ 303/191 |

FOREIGN PATENT DOCUMENTS

| | | |
|---|---|---|
| DE | C2 38 12 600 | 11/1988 |
| EP | A2-0 645 288 | 3/1995 |
| EP | 0 699 568 A2 | 3/1996 |
| EP | 0 747 691 A2 | 12/1996 |
| EP | 747691 A2 * | 12/1996 |
| EP | 0 825 080 A2 | 2/1998 |
| EP | 825080 A2 * | 2/1998 |
| EP | 699568 A2 * | 3/1998 |
| EP | 0 891 904 A2 | 1/1999 |
| JP | 08119086 A | 5/1996 |
| JP | A-8-183439 | 7/1996 |
| JP | 9-188238 | 7/1997 |
| JP | 10002813 A | 1/1998 |
| JP | A-10-114263 | 5/1998 |
| WO | WO 89/01888 | 3/1989 |

* cited by examiner

*Primary Examiner*—Christopher P. Schwartz
*Assistant Examiner*—Robert A. Siconolfi
(74) *Attorney, Agent, or Firm*—Oliff & Berridge PLC

(57) ABSTRACT

A wheel velocity signal for each wheel detected by a wheel velocity sensor is input to a bandpass filter. Signals from frequency bands unrelated to the unsprung resonance are then removed from the wheel velocity signal and only signals from frequency bands related to the unsprung resonance are output. A road surface $\mu$ gradient estimation device uses an online identification method to identify an damping ratio of a second order resonance model similar to a suspension—tire resonance model from the signal output from the bandpass filter. The road surface $\mu$ gradient is then estimated from the identified damping ratio. The damping ratio of the second order resonance model corresponds to the road surface $\mu$ gradient in the following manner: when the damping ratio is identified as being small, the road surface $\mu$ gradient is estimated as being large; and when the road surface $\mu$ gradient is identified as being large, the damping ratio is estimated as being small.

14 Claims, 6 Drawing Sheets

SUSPENSION-TIRE RESONANCE MODEL

SUSPENSION-TIRE RESONANCE MODEL

RELATIONSHIP BETWEEN ROAD SURFACE $\mu$ GRADIENT AND SUSPENSION-TIRE RESONANCE CHARACTERISTICS

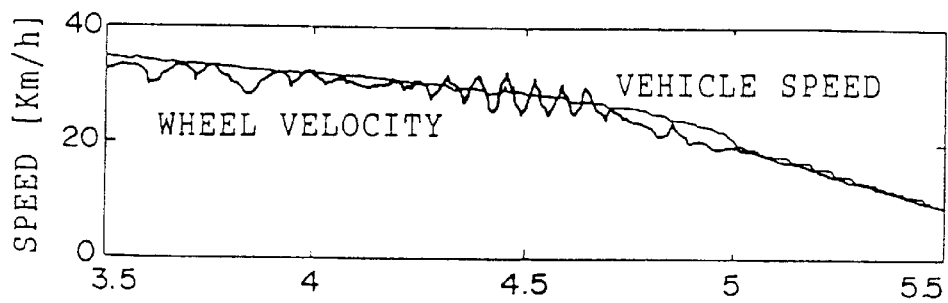
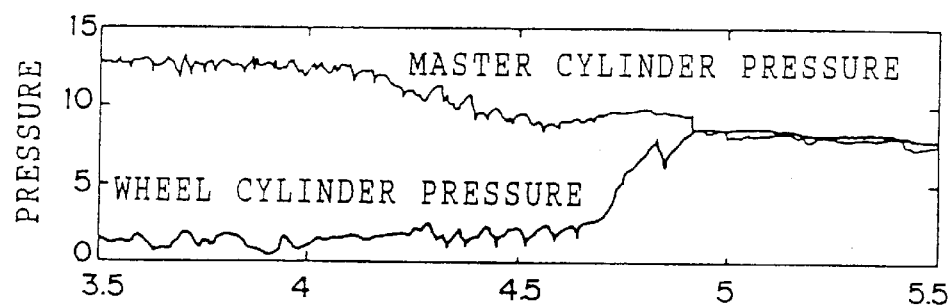
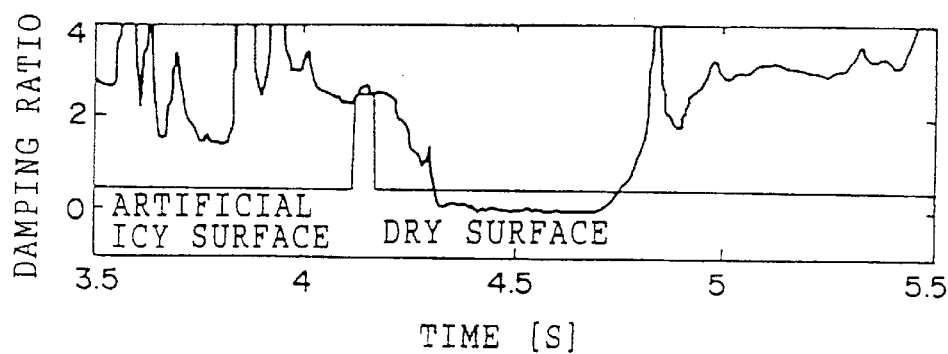
IDENTIFICATION OF DAMPING RATIO
OF WHEEL VELOCITY MOTION

CONTROL USING ESTIMATED VALUE
OF DAMPING RATIO

DEVICE AND METHOD FOR ESTIMATING PHYSICAL QUANTITY AND DEVICE AND METHOD FOR ABS CONTROL

BACKGROUND OF THE INVENTION

1. Field of the Invention

The present invention relates to a physical quantity estimation device for estimating a physical quantity relating to the ease of slippage between a wheel and the surface of a road, and particularly to a physical quantity estimation device capable of accurately estimating a physical quantity relating to the ease of slippage between a road surface and a wheel even when an unsprung resonance phenomenon is generated, and to an ABS control device for controlling braking pressure using this physical quantity estimation device.

2. Description of the Related Art

Japanese Patent Application Laid-Open (JP-A) No. 10-114263 (corresponding to U.S. Pat. No. 6,122,585) discloses an anti-lock braking system (ABS) control device for performing, on the basis of a wheel deceleration dynamic model, a calculation to estimate the torque gradient, i.e. the road surface $\mu$ gradient (the change of the road surface $\mu$ to the change of the slip) from the time series data of a wheel velocity signal, and for then controlling the manipulation variable of the braking force so that the road surface $\mu$ gradient is 0.

When a vehicle travels from an icy road surface onto a dry road surface while the braking force is being controlled so as to be at the maximum amount by the above described ABS control device, then, as is shown in FIG. 1A, an oscillation phenomenon is generated in the wheel velocity. This wheel velocity oscillation phenomenon causes the accuracy of the $\mu$ gradient estimation to be reduced. As is shown in FIG. 1B, in some cases, a delay in the adaptation of the ABS control is also generated.

The present inventors discovered that this phenomenon of oscillation in the wheel velocity is due to resonance movement between the tires and the suspension in the longitudinal direction of the vehicle.

SUMMARY OF THE INVENTION

The present invention is based on the above discovery and aims to provide a physical quantity estimating device capable of accurately estimating a physical quantity relating to the ease of slippage between a wheel and the surface of a road even when longitudinal resonance movement is generated between the tires and the suspension.

In order to achieve the above aim, the present invention comprises: wheel velocity detection means for detecting a wheel velocity and outputting a wheel velocity signal; and physical quantity estimation means for identifying a parameter of a physical model representing unsprung resonance characteristics from the wheel velocity signal, and estimating a physical quantity relating to ease of slippage between a road surface and a wheel from the identified parameter.

According to the present invention, the wheel velocity is detected by the wheel velocity detection means and a wheel velocity signal is output. The physical quantity estimation means identifies the parameter of a physical model representing the unsprung resonance from the wheel velocity signal and estimates a physical quantity relating to the ease of slippage between the road surface and the wheel from the identified parameter.

The physical model of the present invention can be a resonance model which has the unsprung resonance frequency as the undamped natural frequency. In this case, the physical quantity estimation means estimates a physical quantity relating to the ease of slippage between the road surface and the wheel on the basis of the damping ratio of the resonance model.

In the present invention, because a parameter of a physical model representing unsprung resonance characteristics is identified and a physical quantity relating to the ease of slippage between the road surface and a wheel is estimated from the identified parameter, the physical quantity can be accurately estimated even when an unsprung resonance phenomenon is generated.

The present invention is capable of being used in an ABS control device for controlling braking pressure on the basis of the estimated physical quantity.

BRIEF DESCRIPTION OF THE DRAWINGS

FIG. 1A is a line graph showing the relationship between the wheel velocity and time, while FIG. 1B is a line graph showing the relationship between the braking wheel cylinder pressure and time.

FIG. 3A is a line graph showing the relationship between the frequency and the gain, while FIG. 3B is a line graph showing the relationship between the frequency and the phase.

FIGS. 4A to 4C show the results of identifying the damping ratio in the experiment in which a vehicle with the ABS control device according to the present embodiment travels from an icy surface onto a dry surface. FIG. 4A is a line graph showing changes over time in the vehicle speed and wheel velocity, FIG. 4B is a line graph showing changes over time in the master cylinder pressure and wheel cylinder pressure, and FIG. 4C is a line graph showing changes over time in the damping ratio.

FIG. 5A is a line graph showing changes over time in the vehicle speed and wheel velocity, FIG. 5B is a line graph showing changes over time in the master cylinder pressure and wheel cylinder pressure, and FIG. 5C is a line graph showing changes over time in the damping ratio.

DESCRIPTION OF THE PREFERRED EMBODIMENTS

A detailed description of an embodiment in which the physical quantity estimation device of the present invention is used in an ABS control device with reference to the Figures is given below.

Figure 6:
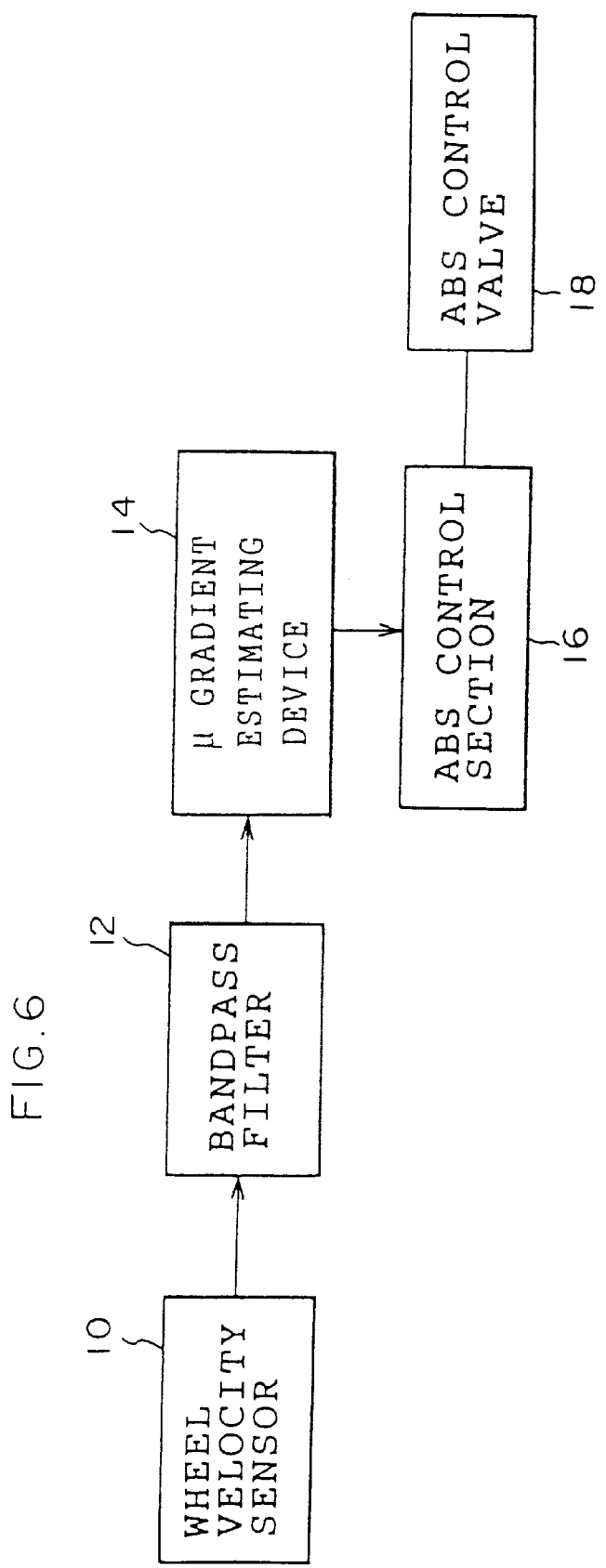
FIG. 6 is a block diagram in which the physical quantity estimation device according to the embodiment of the present invention is used in an ABS control device.

As is shown in FIG. 6, The ABS control device according to the present embodiment is provided with a wheel velocity sensor 10 which detects the wheel velocity of each of the four wheels of a vehicle and outputs a signal such as an electric signal or a numerical signal corresponding to the wheel velocity as a wheel velocity signal. A bandpass filter is connected to the output terminal of the wheel velocity sensor 10. The bandpass filter removes signals of frequency bands which are unrelated to the unsprung resonance from the wheel velocity signal, and passes on only signals of frequency bands which are related to unsprung resonance.

An μ gradient estimating device 14 is connected to the output terminal of the bandpass filter 12. The μ gradient estimating device 14 uses an online identification method to identify, as a parameter, the damping ratio of a second order resonance model closely resembling the suspension—tire resonance model which is a physical model representing unsprung resonance characteristics from the signals output from the bandpass filter 12. The μ gradient estimating device 14 then estimates the road surface μ gradient (referred to below simply as the μ gradient), which is one of the physical quantities relating to the ease of slippage between the road surface and the wheel, from the identified damping ratio. Note that the wheel velocity sensor 10, the bandpass filter 12, and the μ gradient estimating device 14 form the physical quantity estimation device of the present invention.

An ABS control section 16 is connected to the output terminal of the μ gradient estimating device 14. The ABS control section 16 calculates the manipulation variable of the braking force acting on each wheel so that the μ gradient is 0 or a small positive value near 0. An ABS control valve 18, which controls the wheel pressure, is connected to the output terminal of the ABS control section 16.

According to the present embodiment, the wheel velocity signal output from the wheel velocity sensor 10 is input to the bandpass filter 12, and only signals related to the unsprung resonance are output from the bandpass filter 12. Signals in the frequency band related to the unsprung resonance are input to the μ gradient estimating device 14 and the μ gradient is estimated in the method explained below. Next, the manipulation variable of the braking force acting on each wheel is calculated by the ABS control section 16 so that the estimated μ gradient is 0 or a small positive value near 0. The braking master pressure is then controlled by the ABS control valve 18 being controlled in accordance with this manipulation variable.

Next, the principle of the μ gradient estimation of the present embodiment will be explained. Firstly, the relationship between resonance characteristics and μ gradient is explained. The resonance characteristics are those obtained when using a suspension—tire resonance model which takes into account the unsprung characteristics is postulated as a model for expressing the wheel velocity resonance characteristics. As is shown in FIG. 2, this suspension—tire resonance model is formed by connecting a tire T to a vehicle body B via a suspension S.

Figure 1:
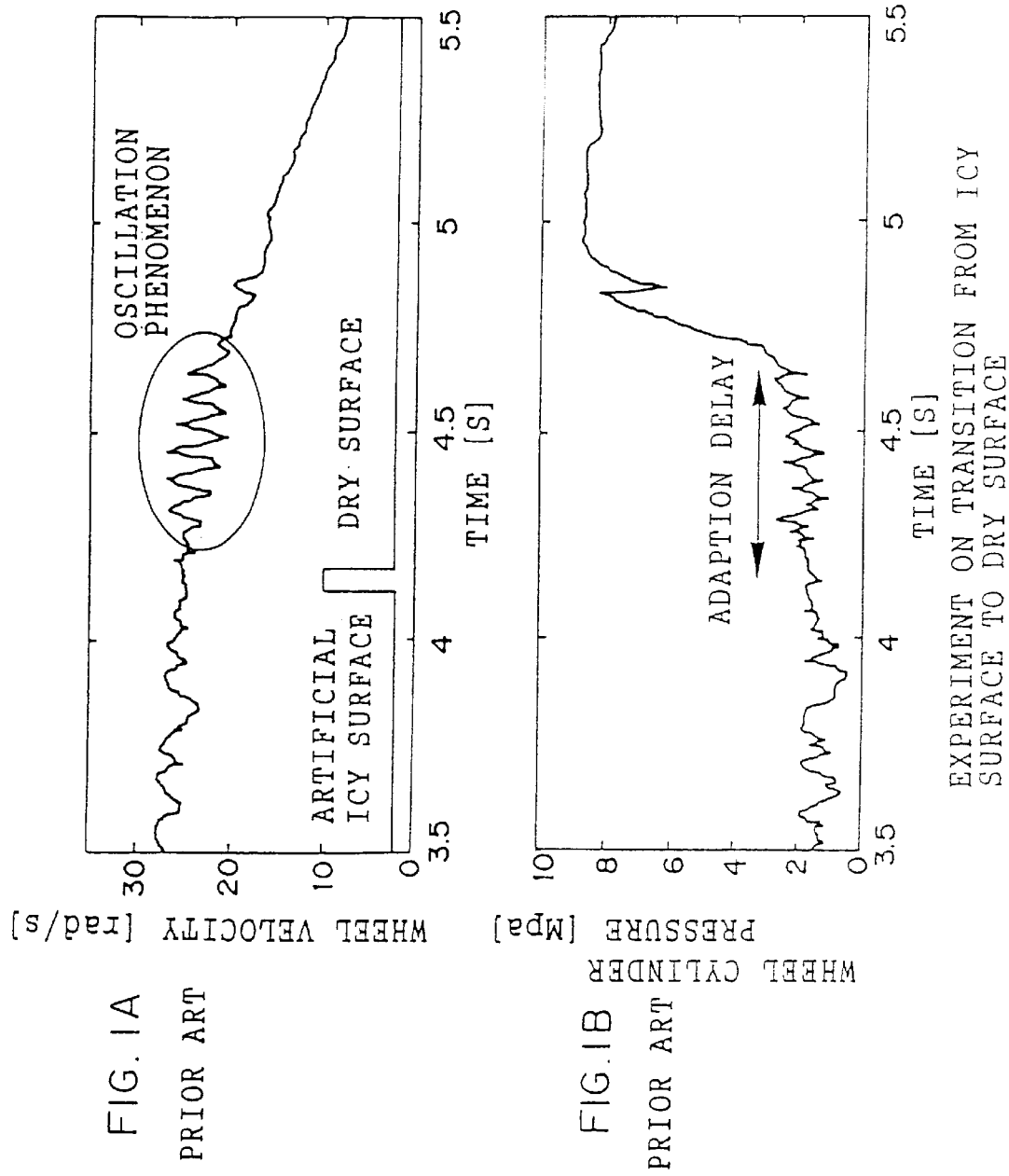
FIGS. 1A and 1B show the results of an experiment using a conventional ABS control device when a vehicle travels from an icy road surface onto a dry road surface.
Figure 2:
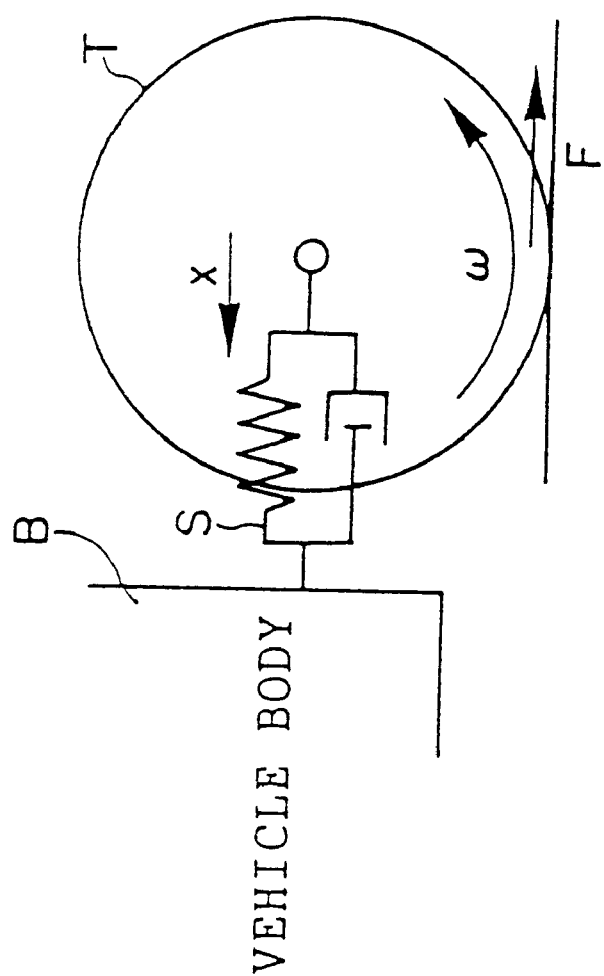
FIG. 2 is a structural diagram showing a suspension—tire resonance model.

The equation (the resonance model between the tires and the suspension in the longitudinal direction of the vehicle) of motion expressing disturbances around the equilibrium point in FIG. 2 is given in the following formulas (1) and (2).

$$I \cdot \dot{\omega} = rF - u \quad (1)$$

$$m \cdot \ddot{x} = -k \cdot x - c \cdot \dot{x} - F \quad (2)$$

wherein I is the wheel inertial moment (e.g., 0.8 Kgm$^2$), m is the mass of the wheel (e.g., 10 Kg), r is the effective radius of the tire (e.g., 0.3 m), k is the spring constant (e.g., 2.0×10$^5$ N/m), c is the damper constant (e.g., 100 Ns/m), F is the tire friction force, u is the braking torque input into the suspension—tire resonance model, ω is the wheel angular velocity, and x is the unsprung longitudinal displacement.

When the tire friction force F is given by the following formula (3), the transfer function Gwu (s) from the braking torque to the wheel angular velocity is given by the following formula (4).

$$F = k_t \cdot N \cdot \frac{\dot{x} - r \cdot \omega}{v_0} \quad (3)$$

wherein $k_t$ is the μ gradient, N is the wheel load (e.g., 3000 N), and $V_o$ is the vehicle speed (e.g., 10 m/s).

$$G_{wx}(s) = -\frac{mv_0 \cdot s^2 + (Nk_t + cv_0) \cdot s + kv_0}{mIv_0 \cdot s^2 + (Nk_t I + cv_0 I + mr^2 Nk_t) \cdot s^2 + (kv_0 I + cr^2 Nk_t) \cdot s + kr^2 Nk_t} \quad (4)$$

Figure 3A:
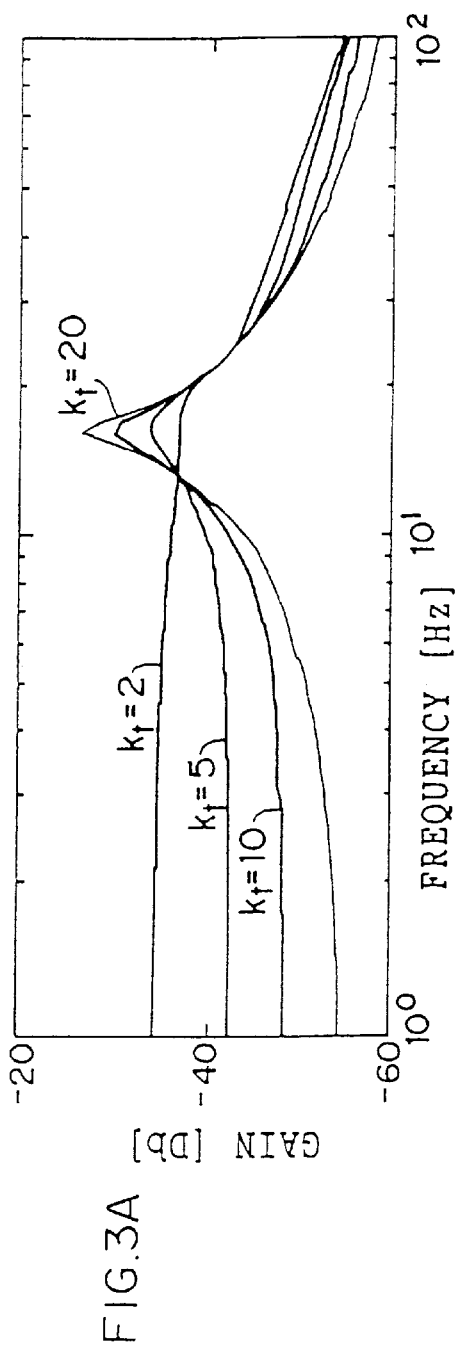
FIGS. 3A and 3B show relationships between the road surface a gradient and the suspension—tire resonance characteristics.
Figure 3B:
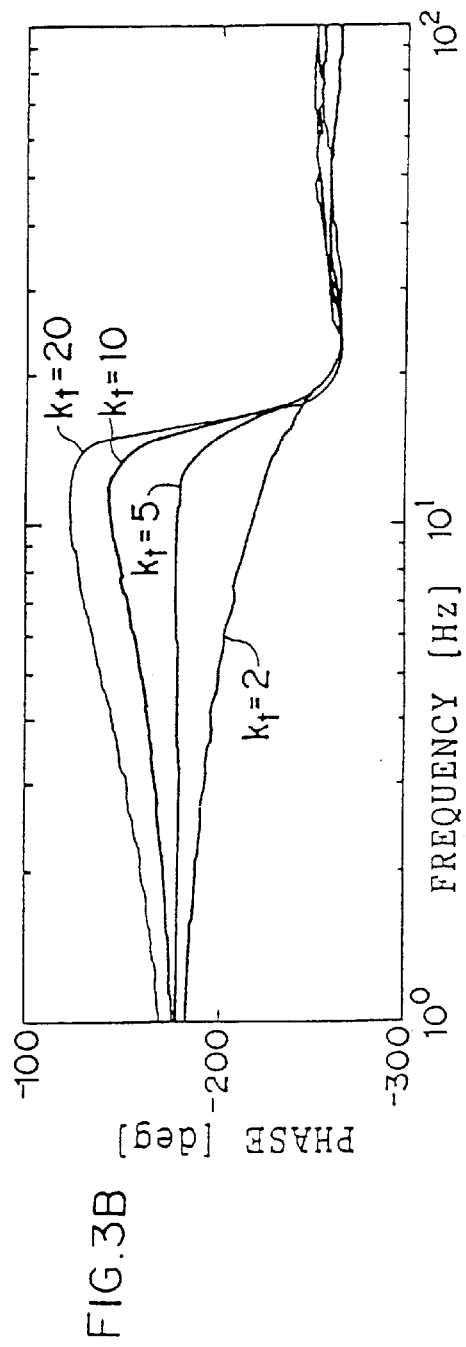

FIGS. 3A and 3B are Bode diagrams of formula (4) when the μ gradient $k_t$ is 2, 5, 10, and 20. It can be understood from FIGS. 3A and 3B that as the μ gradient increases and a margin is generated in the tire characteristics, the characteristics begin to show oscillation.

Next, the μ gradient estimation will be explained. The μ gradient estimation may be carried out on the basis of formula (4), however, this explanation will use the second order resonance model of formula (5) (a simplification of formula (4)) which makes the unsprung resonance frequency a natural frequency.

$$G_{wu}(s) = \frac{K\omega_n^2}{s^2 + 2\zeta\omega_n s + \omega_n^2} \quad (5)$$

wherein K is normal gain, ωn is the undamped natural frequency, and ζ is the damping ratio. Further, instead of directly performing an estimation of the μ gradient, the damping ratio ζ of this model is identified and the μ gradient is estimated from the identified damping ratio ζ. The μ gradient $k_t$ and the damping ratio ζ form the approximate relationship given below which represents an inverse number.

Accordingly, by identifying the damping ratio, it is possible to estimate the μ gradient using the above formula. The resonance characteristics in the natural frequency are clearer the smaller the damping ratio of the second order resonance model, therefore, when the damping ratio is identified as being small, the μ gradient is estimated to be large. Conversely, when the damping ratio is identified as being large, the μ gradient is estimated to be small.

The following formula (6), obtained by rearranging the wheel velocity and braking torque from the above formula (5), is used to explain the identification of the damping ratio.

$$2\zeta\omega_n SW = -S^2 W - \omega_n^2 W + K\omega_n^2 u \quad (6)$$

In formula (6), as is explained below, the braking torque u, which is an input factor, can be ignored, the formula (7), which is obtained by ignoring the braking torque, is made discrete, and the damping ratio can be identified by applying an online identification method to the formula (11), which is obtained by making formula (7) discrete.

Firstly, if the input of the braking torque is ignored, formula (6) is expressed by formula (7) below.

$$2\zeta\omega_n SW = -S^2 W - \omega_n^2 W \quad (7)$$

Formula (7) is made discrete by substituting the Tustin conversion of formula (8) below in formula (7).

$$s = \frac{2(z-1)}{\tau(z+1)} \tag{8}$$

wherein $\tau$ is the sampling time.

Note that the Euler's backward method expressed in formula (9) below may be used as the method for making a formula discrete as well as the Tustin conversion method.

$$s = \frac{z-1}{\tau z} \tag{9}$$

Formula (7) resulting from the Tustin conversion can be rearranged as in formula (10) below.

$$4\omega_n\tau(z^{-2}-1)W\zeta=(\omega_n^2\tau^2+4)(z^{-2}+1)W+(2\omega_n^2\tau^2-8)W \tag{10}$$

Formula (10) can be expressed as a time domain giving formula (11) below.

$$\phi\zeta=y$$

wherein $$\phi=4\omega_n\tau(W[i-2]-W[i])$$

$$y=(\omega_n^2\tau^2+4)(W[i-2]+W[i])+(2\omega_n^2\tau^2-8)W[i-1] \tag{11}$$

Here, formula (11) has been obtained by making formula (7) discrete and, therefore, formula (11) corresponds to formula (7). Thus the physical meanings of $\phi$ and y can be interpreted as follows. $\phi$ is the physical amount corresponding to the change in the wheel velocity, while y is the physical amount corresponding to the wheel velocity and the change in the wheel velocity.

Next, the online identification method is applied to formula (11). Here, the damping ratio $\zeta$ is identified using the instrumental variable method. The algorithm using the instrumental variable method is expressed as is shown in formula (12) below.

$$Z=W[i-3]$$

$$H = \frac{P[i-1]z}{\lambda + \phi P[i-1]z}$$

$$\theta[i]=\theta[i-1]+H\cdot(y-\phi\cdot\theta[i-1])$$

$$P[i] = \frac{1}{\lambda}(1-H\phi)\cdot P[i-1] \tag{12}$$

wherein $\lambda$ is a forgetting coefficient.

FIGS. 4A to 4C show the results when the damping ratio is identified using the instrumental variable method. The figures show that, in accordance with the oscillation characteristics after the vehicle has traveled onto the dry surface, the identified value of the damping ratio becomes smaller, in other words, the $\mu$ gradient becomes larger, and a margin is generated in the braking force characteristics. Thus, it can be seen that an appropriate identification has been made.

Figure 5A:
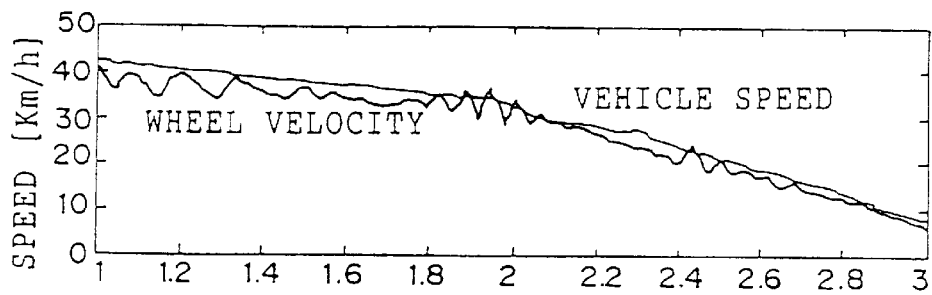
FIGS. 5A to 5C show the results of ABS control using damping ratio identification values according to the present embodiment.
Figure 5B:
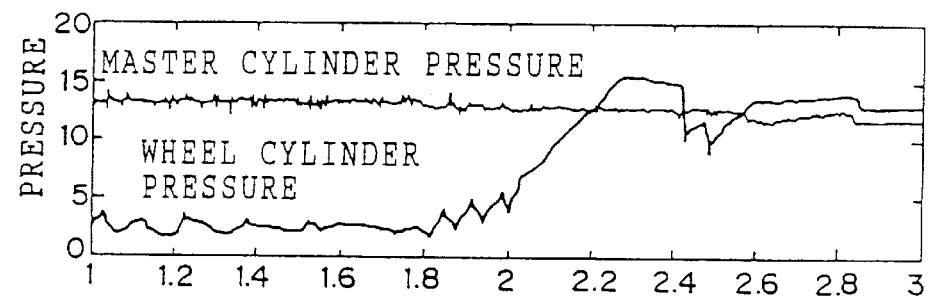
Figure 5C:
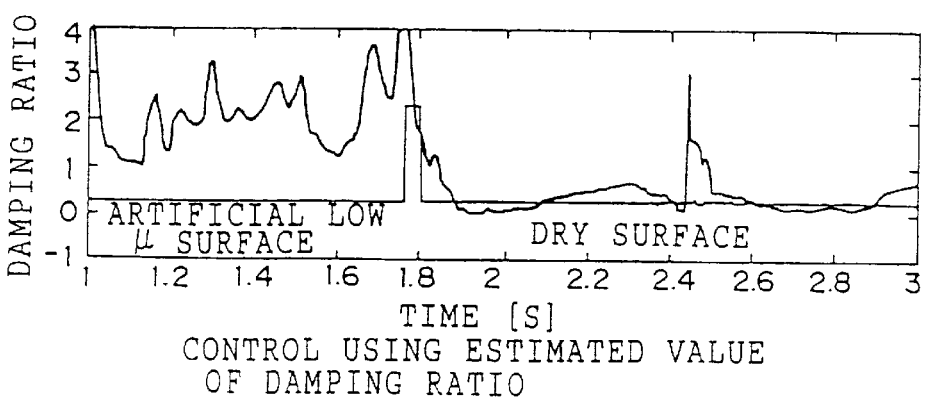

FIGS. 5A to 5C show the results of an experiment in which, at the point when the estimated value of the damping ratio has gone below 0.4, it is determined that the $\mu$ gradient is large and a margin has been generated in the braking force characteristics, in other words, that the vehicle has traveled onto a high $\mu$ (dry) road surface, and the braking hydraulic pressure is made to increase at a consistent rate to a pressure appropriate for a high $\mu$ road surface (as shown by the ramp-shaped portion of the graph in FIG. 5B). In this way, a sufficient braking force suitable for the road surface can be achieved.

Note that the above explanation was for an example in which the damping ratio was identified using an instrumental variable method, however, the present invention is not limited to this and another identification method such as the least squares method may be used to identify the damping ratio.

Moreover, the physical quantity estimation device of the present invention can also be used for determining road surface conditions or the condition of a vehicle.

Further, the above explanation was for an example in which the $\mu$ gradient, which is one of the physical quantities relating to the ease of slippage between the road surface and a vehicle wheel, was estimated, however, as is also understood from formula (4), the transfer function Gwu (s) is also changed by variations in the wheel load and the vehicle speed. Accordingly, the amount estimated may be one in which at least one of the variations in the wheel load and vehicle speed has been added to the $\mu$ gradient, which is one of the physical quantities relating to the ease of slippage between the road surface and a vehicle wheel.

What is claimed is:

1. A physical quantity estimation device, comprising:
   wheel velocity detection means for detecting the velocity of a wheel and outputting a wheel velocity signal; and
   physical quantity estimation means for identifying a damping ratio parameter of a physical model of a system having a tire and a suspension expressing unsprung resonance characteristics of a suspension-tire relationship in a longitudinal direction of a vehicle, the parameter being identified from the wheel velocity signal, and estimating a physical quantity relating to ease of slip between a road surface and a wheel from the identified parameter.

2. The physical quantity estimation device according to claim 1, wherein the physical quantity relating to ease of slip between a road surface and a wheel is a road surface $\mu$ gradient.

3. The physical quantity estimation device according to claim 2, wherein the physical model is a resonance model which has an unsprung resonance frequency as an undamped natural frequency, the parameter is a damping ratio of the resonance model, and the road surface $\mu$ gradient and the damping ratio are in inverse relation.

4. The physical quantity estimation device according to claim 1, wherein the physical model is a resonance model between a tire and a suspension in a longitudinal direction of a vehicle.

5. The physical quantity estimation device according to claim 4, wherein the resonance model is an equation expressing a relation among a physical quantity corresponding to a change in the wheel velocity, a physical quantity corresponding to the wheel velocity and the change in the wheel velocity, and a damping ratio of the resonance model.

6. The physical quantity estimation device according to claim 4, wherein the resonance model is a second order resonance model.

7. The physical quantity estimation device according to claim 1, further comprising a bandpass filter which passes on only signals of frequency bands which are related to unsprung resonance, wherein the physical quantity estimation means identifies the parameter from the signals passed through the bandpass filter.

8. An ABS control device comprising:

the physical quantity estimation device according to claim 1; and control means for controlling braking pressure on the basis of a physical quantity estimated by the physical quantity estimation device.

9. The ABS control device according to claim 8, wherein the physical quantity relating to ease of slip between a road surface and a wheel is a road surface $\mu$ gradient and the control means controls the braking pressure so that the road surface $\mu$ gradient is 0 or approximately 0.

10. The ABS control device according to claim 8, wherein the control means increases the braking pressure in a ramp-shaped manner so that the braking pressure is adapted to a high $\mu$ road surface when the control means judges that the vehicle has traveled onto a high $\mu$ road surface on the basis of the physical quantity.

11. A physical quantity estimation method, comprising the steps of:

detecting a velocity of a wheel and outputting a wheel velocity signal;

identifying a damping ratio parameter of a physical model of a system having a tire and a suspension expressing unsprung resonance characteristics of a suspension-tire relationship in a longitudinal direction of a vehicle, the parameter being identified from the wheel velocity signal; and estimating a physical quantity relating to ease of slip between a road surface and a wheel from the identified parameter.

12. The physical quantity estimation method according to claim 11, wherein the physical model is a resonance model which has an unsprung resonance frequency as an undamped natural frequency, and when estimation of the physical quantity is performed, the physical quantity is estimated on the basis of a damping ratio of the resonance model.

13. An ABS control method in which braking pressure is controlled on the basis of a physical quantity estimated using the physical quantity estimation method according to claim 11.

14. An ABS control method in which braking pressure is controlled on the basis of a physical quantity estimated using the physical quantity estimation method according to claim 12.

* * * * *